United States Patent [19]

Daly

[11] Patent Number: 4,987,863
[45] Date of Patent: Jan. 29, 1991

[54] VARIABLE COMPRESSION RATIO INTERNAL COMBUSTION ENGINE

[75] Inventor: Paul D. Daly, Troy, Mich.

[73] Assignee: Siemens-Bendix Automotive Electronics L.P., Troy, Mich.

[21] Appl. No.: 414,040

[22] Filed: Sep. 28, 1989

[51] Int. Cl.[5] .............................................. F02B 75/04
[52] U.S. Cl. ................................................ 123/48 AA
[58] Field of Search .............. 123/48 A, 48 AA, 48 D, 123/78 AA, 78 D

[56] References Cited

U.S. PATENT DOCUMENTS

| | | | |
|---|---|---|---|
| 2,758,582 | 8/1956 | Humphreys | 123/48 AA |
| 2,883,974 | 4/1959 | Heising | 123/48 AA |
| 4,187,808 | 2/1980 | Audoux | 123/78 AA |
| 4,516,537 | 5/1985 | Nakahara et al. | 123/48 AA |
| 4,827,882 | 5/1989 | Paul et al. | 123/78 AA |

FOREIGN PATENT DOCUMENTS

| | | | |
|---|---|---|---|
| 3117133 | 11/1982 | Fed. Rep. of Germany | 123/48 AA |
| 3339578 | 5/1984 | Fed. Rep. of Germany | 123/78 AA |
| 3336523 | 4/1985 | Fed. Rep. of Germany | 123/48 A |

Primary Examiner—David A. Okonsky
Attorney, Agent, or Firm—George L. Boller; Russel C. Wells

[57] ABSTRACT

A variable compression ratio internal combustion engine having at least one cylinder, a piston disposed in the cylinder and a cylinder head disposed at one end of the cylinder. The cylinder head has a combustion chamber and a piston chamber contiguous with the top of the cylinder. A movable piston disposed in the piston chamber to change the effective volume of the combustion chamber. A closed end of the piston chamber is connected to one of the engine's source of pressurized fluid. A solenoid valve is disposed between the source of pressurized fluid and the piston chamber. Energization of the solenoid valve is controlled by a controller to open the solenoid valve when the combustion chamber has a low pressure to displace the movable piston to increase the compression ratio of the engine and to open the solenoid valve when the combustion chamber has a high or peak pressure to displace the movable piston to decrease the compression ratio.

11 Claims, 2 Drawing Sheets

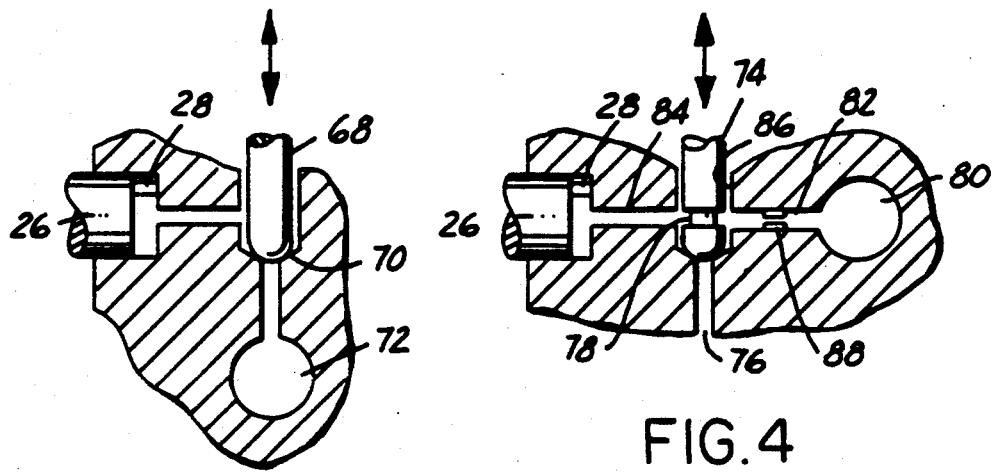
FIG.3
FIG.4
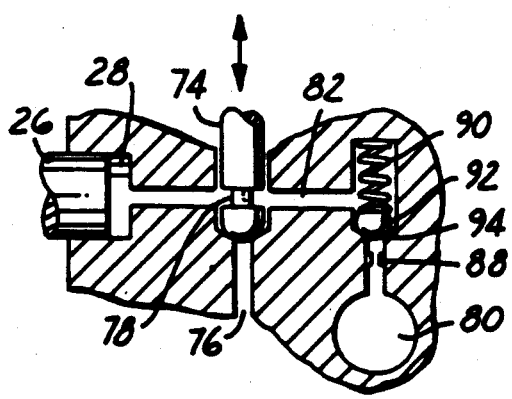
FIG.5
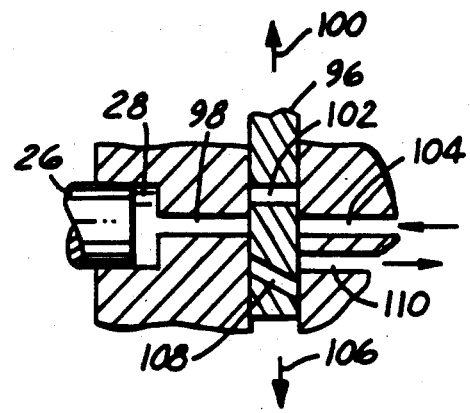
FIG.6

VARIABLE COMPRESSION RATIO INTERNAL COMBUSTION ENGINE

BACKGROUND OF THE INVENTION

1. Field of the Invention

The invention is related to the field of internal combustion engines and in particular to an internal combustion engine having a variable compression ratio.

2. Description of the Prior Art

Recent tests conducted by Queens University of Northern Ireland have shown that the fuel efficiency of an internal combustion engine, in particular a two cycle internal combustion engine, can be significantly improved if the compression ratio of the engine is changed under various operating conditions. In general, these tests have shown that for maximized fuel efficiency the compression ration is an inverse function of engine loads. since current electronic fuel injection controllers normally compute engine loads in the computation of engine's fuel requirements, the value of the engine load may also be used in controlling the effective compression ratio of the engine.

SUMMARY OF THE INVENTION

The invention is a mechanism for changing the effective volume of the engine's combustion chamber to control the engine's compression ratio as a function of engine load.

The invention is a variable compression ratio internal combustion engine having at least one cyclinder, a reciprocating piston disposed in the cylinder, and a source of pressurized fluid. The engine has a cylinder head attached to one end of the cylinder, forming in conjuction therewith a combustion chamber. A piston chamber is provided in the cylinder head having an open end in communication with the combustion chamber and a closed end. A moveable piston is disposed in the piston chamber and displaceable therein to change the effective volume of the combustion chamber. A fluid passage connects the closed end of the piston chamber to a pressurized fluid source and a solenoid valve controls the fluid flow between the piston chamber and the pressurized fluid source to change the position of the movable piston in the piston chamber. Changing the positon of the movable piston in the piston chamber changes the volume of the combustion chamber and the compression ratio of the engine.

An electronic control unit (ECU) responsive to the load on the engine will generate a first signal opening the solenoid valve when the pressure in the combustion chamber has a minimum value, causing the fluid from the pressurized fluid source to displace the piston towards the combustion chamber. Conversely, the controller (i.e. the ECU) in response to the engine load is also capable of energizing the solenoid valve when the pressure in the combustion chamber has a maximum value, causing the maximum pressure in the combustion chamber to displace the piston towards the closed end of the piston chamber and thereby increasing the effective volume of the combustion chamber.

One object of the invention is a mechanism for optimizing the fuel efficiency of an engine by varying the compression ratio of the engine.

Another object of the invention is to vary the engine's compression ration by varying the effective volume of its combustion chamber.

Still another object of the invention is the use of an existing source of pressuirzed fluid of the engine and the pressure in the engine's combustion chamber to vary the effective volume of the combustion chamber.

Another object of the invention is to use an existing source of pressurized fluid, such as the pressuirzed oil or fuel sources, to displace a piston in a piston chamber having an open end connected to the combustion chamber.

Still another object of the invention is to vary the effective volume of the combustion chamber by coordinating the opening of a solenoid valve when the pressure in the combustion chamber has either a maximum pressure or a minimum pressure.

These and other object of the invention will become more apparent from a reading of the specification in conjunction with the drawings.

BRIEF DESCRIPTION OF THE DRAWINGS

FIG. 3 is a partial cross-section showing a first arrangement between the solenoid valve, the pressurized fluid source and the piston chamber;

FIG. 4 shows an alternate arrangement between the solenoid valve, the pressurized fluid source and the piston chamber;

FIG. 5 shows an alternate embodiment of the arrangement shown in FIG. 4 including a check valve; and FIG. 6 shows an alternate arrangement using a three-way valve between the pressurized fluid source and the piston chamber.

DETAILED DESCRIPTION OF THE PREFERRED EMBODIMENT

Figure 1:
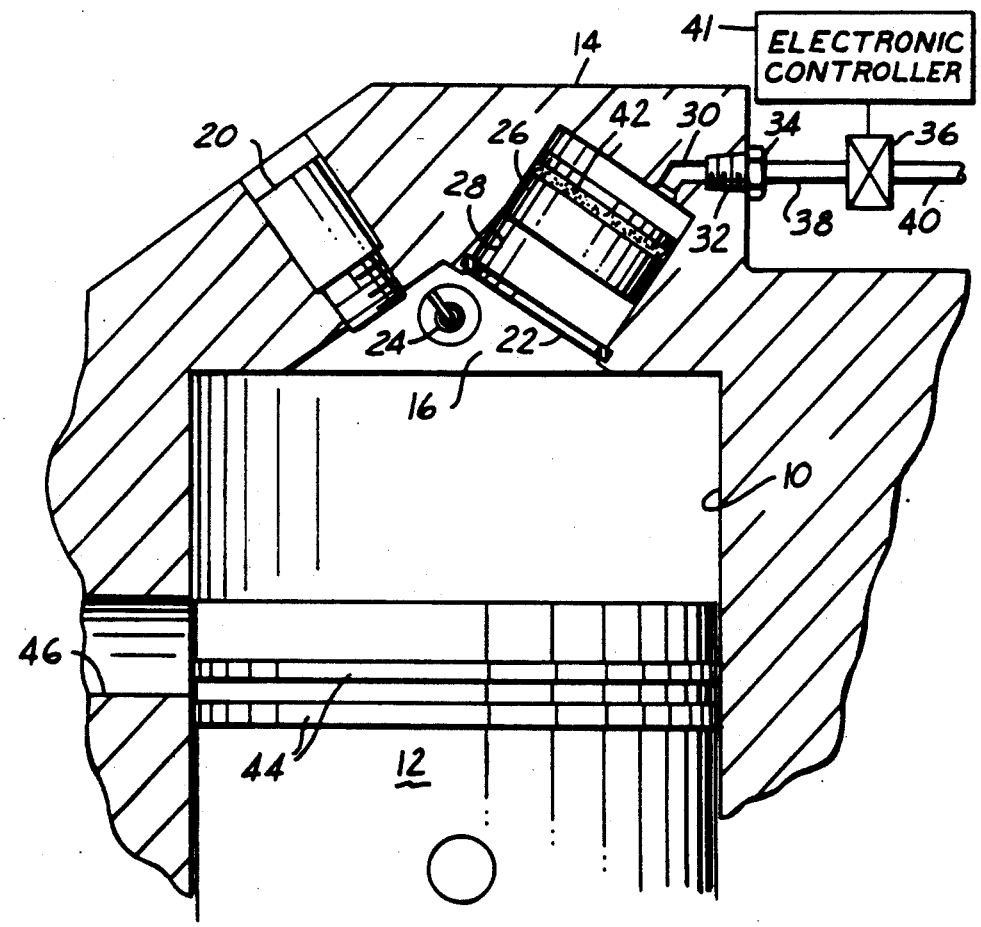
FIG. 1 is a partial cross section of an internal combustion engine having a variable effective volume combustion chamber.

FIG. 1 shows a partial cross section of a first embodiment of an internal combustion engine having a variable compression ratio. The internal combustion engine has a cylinder 10 and a piston 12 reciprocally received in the cylinder and connected to the engine crank shaft (not shown in a conventional manner. The engine has a cylinder head 14. The cylinder head 14 has formed therein a combustion chamber 16 exposed to the internal volume of the cylinder head 10. The cylinder head 14 also has a fuel injector port receiving a fuel injector 20 and a spark plug port receiving a sparl plug 24.

A movable piston 26 is disposed in a piston chamber 28 provided in the cylinder head 14. One end of the piston chamber 28 is closed and the other end opens into the combustion chamber 16. A fluid passageway 30 connects the closed end of the piston chamber 28 to a fluid port 32. The fluid port 32 may be threaded as shown to receive a fluid connector 34. The fluid connector 34 is connected to a solenoid valve 36 by means of a fluid line 38. The other end of the solenoid valve 36 is connected to a pressurized fluid source (not shown) by a fluid line 40. A controller 41 actuates the solenoid valve 36, as shall be discussed hereinafter. The pressurized fluid source may be engine's pressurized oil supply, the engine's pressurized fuel supply, a pressure from a adjacent engine cylinder or any other source of pressurized fluid.

The movable piston 26 will also have one or more sealing members 42 which sealingly engage the internal wall of the piston chamber. The sealing members 42 may be brass or metal rings comparable to piston rings 44 used to seal the space between the piston 12 and the internal wall of the cylinder 10. Those skilled in the art will recognize the metal bellows may be used in place of the sealing members 42 to prevent fluid and gas leakage between the combustion chamber 16 and the volume enclosed between the movable piston 26 and the closed end of the piston chamber 28.

The cylinder head 14 may also include an exhaust port 46 and an intake port (not shown) as normally provided on a cylinder head of a two cycle internal combustion engine.

Preferably the controller 41 is an electronic control unit designed to optimize the engine's compression ratio as a function of engine load. The controller 41 will energize the solenoid valve 36 when the combustion chamber 16 has a minimum pressure to increase the engine's compression ratio and energize the solenoid valve 36 when the combustion chamber has a peak pressure to decrease the compression ratio. Energizing the solenoid valve 36 when the combustion chamber 16 has a minimum pressure will connect the closed end of the piston chamber 28 to the source of pressurized fluid pressurizing the volume behind the movable piston 26. This will cause the movable piston 26 to be displaced towards the open end of the piston chamber 28 decreasing the effective volume of the combustion chamber 16. Decreasing the effective volume of the combustion chamber 16 results in an increase in the engine's compression ratio. A stop ring 22 received in an annular groove provided in the cylinder head 14 adjacent to the open end of the piston chamber 28 determines the final position of the movable piston 26 as it is diplaced towards the combustion chamber 16.

Conversely, when the controller 41 energizes the solenoid valve 36 when the combustion chamber 16 has a maximum or peak pressure, the piston will be displaced away from the combustion chamber to decrease the compression ratio. Energizing the solenoid valve 36 connects the closed end of the piston chamber 28 to the source of pressurized fluid. The peak pressure in the combustion chamber 16 is greater than the source of pressurized fluid and causes the movable piston 26 to be displaced towards the closed end of the piston chamber 28. The displacement of the movable piston 26 towards the closed end of the piston chamber increases the effective volume of the combustion chamber 16 and decreases the compression ratio of the engine. The time at which the combustion chamber 16 has a peak or a maximum pressure can be determnined by measuring the rotational position of the engine's crankshaft using conventional sensors such as developed for electronic fuel injector control units.

The change in the compression ration of the cylinder can readily be computed from the physical geometry of the system. Consider, for example, a three cylinder two cycle engine having a total displacement of 1.15 liters or 383 cc per cylinder. Each cylinder has trapped swept volume of approximately 202 cc and a residual or clearance volume of 28.55 cc. The trapped swept volume is the volume displaced by the movable piston 26 after the exhaust valve is closed. The clearance volume is the volume in the cylinder. including the volume of the combustion chamber 16 above the piston 12 when the piston is at its top dead center position.

The compression ration for a two cycle engine is given by the equation:

Trapped compression ratio =

$$\frac{\text{Trapped swept volume + Clearance volume}}{\text{Clearance volume}}$$

Consider now a movable piston 26 having a diameter of 2.6 cm which can be displaced a distance of 10 mm towards the closed end of the piston chamber 28 when the solenoid valve is opened and the pressure in the combustion chamber has its peak pressure. The change in the volume of the combustion chamber due to the displacement of the movable piston 26 through a distance of 10 mm is 5.3 cc. For this configuration the highest trapped compression ratio (HTCR) is:

$$HTCR = \frac{202 + 28.85}{28.85} = 8.0$$

while the lowest trapped compression ration (LTCR) is:

$$LTCR = \frac{202 + 28.85 + 5.3}{28.85 + 5.3} = 6.9$$

The percent change in the compression ratio is:

% change =

$$\left(\frac{HTCR - LTCR}{LTCR} \times 100 = \frac{8.0 - 6.9}{6.9}\right) \times 100 = 16\%$$

Thus it can be seen that a relatively small displacement of the movable piston 26 can produce a significant change in the trapped compression ratio. It is also evident that by controlling the diameter of the movable piston 26, the displacement distance or the trapped compression ration may be varied to optimize the fuel efficiency of the engine for a particular engine load.

Figure 2:
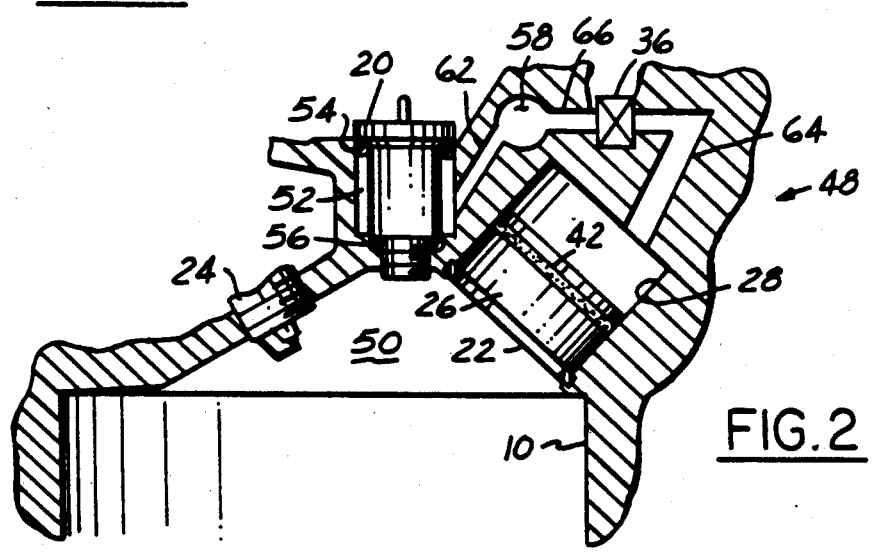
FIG. 2 shows an alternate embodiment of the cylinder head in which fluid from the engine's pressurized fluid supply is used to vary the effective volume of the combustion chamber.

FIG. 2 shows an embodiment of the variable compression engine in which the pressurized fuel for the fuel injector valves is used to displace the movable piston 26. In this embodiment, elements which correspond to identical elements in the embodiment shown in FIG. 1 will have the same reference numerals. Referring to FIG. 2, a cylinder head 48 forms a conically-shaped combustion chamber 50 at the upper end of the cylinder 10. Although not shown, a piston such as the piston 12 in FIG. 1 is disposed in the cylinder 10 for reciprocation therein. The cylinder head 48 has a spark plug port for receiving a spark plug 24 and a fuel injector port for receiving a fuel injector 20. As shown in FIG. 2, a pressurized high pressure fuel reservoir 52 is formed around the fuel injector 20 from which the injector obtains its fuel to be injected into the combustion chamber 50. The fuel resevoir 52 is sealed at its opposite ends by a pair or ring seals 54 and 56. The fuel reservoir 52 receives, by means of an internal fuel passageway 62, pressurized fuel from a fuel gallery or rail 58 provided in the cylinder head 48.

The cylinder head 48 also has a piston chamber 28 and a movable piston 26 corresponding to the movable piston 26 and the piston chamber 28 illustrated in FIG. 1.

The closed end of the piston chamber 28 is connected to the solenoid valve 36 by means of an internal fluid passageway 64. The solenoid valve 36 is also connected to the fuel rail 58 by an internal fluid passageway 66. A stop ring 22 is disposed in an annular slot provided adjacent to the open end of the piston chamber 28 to establish the maximum forward position of the movable piston 26. The movable piston 26 will also have a sealing member 42 which prevents fuel from leaking from the region between the movable piston 26 and the closed end of the piston chamber 28 into the combustion chamber 50. Again, the sealing member 42 may be metal bellows as is known in the art.

FIGS. 3 through 5 show different solenoid valve arrangements between the piston chamber 28 and the pressurized fuel source. In FIG. 3, a movable plunger 68 of the solenoid valve 36 is spring loaded against a valve seat 70 and blocks the fuel passageway between a pressurized fluid source 72 and the piston chamber 28. When the solenoid valve 36 is energized, the movable plunger is retracted from the valve seat permitting a fluid flow between the piston chamber 28 and the pressurized fluid source 72. As previosly discussed, if the solenoid valve 36 is opened when the pressure in the combustion chamber has a minimum value, the fluid flows from the pressurized fluid source to the piston chamber 28 displacing the piston towards the combustion chamber 16. However, if the solenoid valve 36 is open during a period of peak pressure, the piston is displaced away from the combustion chamber 16 and the fluid flows from the piston chamber 28 to the pressurized fluid source. The pressurized fluid source 72 may be either the engine's pressurized oil or pressurized fuel source as previosly discussed.

In the arrangement shown in FIG. 4, a plunger 74 of the solenoid valve 36 is resiliently biased to occlude an opening of a fluid passageway 76 which leads to an unpressurized fluid sump or reservoir (not shown). The plunger 74 also has an annular recess 78 which provides for a fluid connection between a pressurized fluid source 80 and the piston chamber 28 via fluid passageways 82 and 84. Alternatively, the annular recess 78 may be provided in the walls of a plunger well 86. A fluid restriction or orifice 88 is disposed in the fluid passageway 82 to limit the rate at which the fluid can flow through the fluid passageway 82. In the static position of the plunger 74, as shown in FIG. 4, the fluid passageway 76 to the fluid sump or reservoir is blocked. However, fluid from the pressurized fluid source 80 is transmitted by the fluid passageways 82 and 84 and the annular recess 78 to the piston chamber 28 urging the piston towards the combustion chamber 16. The orifice 88 limits the rate at which the fluid flows from the pressurized fluid source to the piston chamber 28 or to the unpressurized reservoir when the plunger 74 is withdrawn from its seat.

In a typical example, it may be assumed that the pressurized fluid source is the pressurized fuel being supplied to the fuel injector valves having a pressure of approximately 600 psi. During the exhaust period of the cylinder, the pressure in the combustion chamber 16 will be low so that almost all the fuel pressure will be applied against the movable piston 26 urging it towards the combustion chamber. During the peak pressure period in the combustion chamber 16, the pressure applied to the face of the movable piston 26 facing the combustion chamber 16 will be approximately 700 psi. The pressure differential across the movable piston 26 during this peak pressure period will be about 100 psi. Since this pressure is significantly less than the pressure applied to the movable piston 26 during the exhaust period, the principal fluid flow will be from the pressurized fluid source 80 to the piston chamber 28 displacing the piston towards the combustion chamber 16.

When the plunger 74 is displaced away from the fluid passageway 76 during peak pressure periods, the piston chamber 28 will be vented to the unpressurized reservoir through the fluid passageway 76 resulting in the piston being displaced away from the combustion chamber 16. The orifice 88 will limit the rate of fluid flow from the pressurized fluid source 80 to the reservoir so there is no significant change in the pressure of the pressurized fluid source when the fluid passageway 76 is opened by the displacement of plunger 74.

With the arrangement shown in FIG. 4, the movable piston 26 is displaced towards the combustion chamber when the solenoid valve 36 is deenergized and displaced away from the combustion chamber when the solenoid valve 36 is energized. This arrangement does not require energization of the solenoid valve to be timed with the periods of a peak or minimum pressure in the combustion chamber as is required in the arrangement shown in FIG. 3.

If the pressurized fluid source is the engine's pressurized oil supply, the arrangement shown in FIG. 4 may include a check valve as shown in FIG. 5 which permits the fluid to flow from the pressurized fluid source 80 to the piston chamber 28 but inhibits a fluid flow from the piston chamber 28 towards the pressurized fluid source. The check valve may be a simple ball and spring check valve having a spring 90 biasing a ball 92 against a valve seat 94 as shown. Alternatively, the check valve may be a simple flapper valve as known in the art.

In the embodiment shown in FIG. 6, the solenoid valve 36 consists of a three-way valve having a spool member 96 resiliently biased to an intermediate position as shown. In this position, a fluid passageway 98 to the piston chamber 28 is blocked preventing any fluid from entering or leaving the piston chamber 28. If the spool member 96 is displaced downward in the direction of arrow 106 from the intermediate position during a low pressure period in the combustion chamber 16, the piston chamber 28 receives pressurized fluid from a pressurized fluid source (not shown) by means of a fluid passageway 102 and a fluid input passageway 104 connected to the pressurized fluid source. The pressurized fluid will displace the movable piston 26 towards the combustion chambers increasing the compression ratio as previously described.

If the spool member 96 is displaced upward in the direction of arrow 100 from the intermediate position, the piston chamber 28 is connected to a low pressure fluid reservoir (not shown) by a fluid passageway 108 and a fluid passageway 110. This arrangement eliminates the fluid displaced by the movable piston 26 during peak pressure periods in the combustion chamber 16 from being returned to the pressurized fluid source or the need for a separate check valve to prevent the fluid from being returned to the pressurized fluid source as shown in FIG. 5.

It is not necessary to have a separate solenoid valve for each cylinder in a multiple cylinder internal combustion engine since the main engine port events occur over a relatively large range of crank angles. Typically, for a two cycle engine, the exhaust port is open for 180 of crank angle rotation. Take for example, a three cylinder two cycle engine. If the exhaust port is open for 180° of crank angle rotation and there is a 120° phase difference between the three cylinders, there are 60° of crank angle rotation (180°-120°) where two cylinders simultaneously have their exhaust ports open and, therefore, the pressure in these two cylinders is substantially atmospheric pressure. At an engine speed of 2,000 rpm, the time when two cylinders are simultaneously at atmospheric pressure is approximately 5 millisecond.

As indicated above, if it is required to displace the piston 10 mm, a fluid flow of approximately 30 liters per minute would be required to displace the piston 10 mm in one cycle. However, there is no requirement that the movable piston 26 be displaced the full 10 mm during a single revolution of the crankshaft; therefore, the displacement of the movable piston 26 may be incremented during each revolution of the crankshaft so full displacement of the piston will be spread out over several cycles. Under these conditions the 5 milliseconds time period in which the two exhaust valves are simultaneously open will be adequate for actual displacement of the piston.

It is not anticipated that the solenoid valves will be leak free; therefore, it may be necessary to periodically add fluid to or remove fluid from the piston chamber to maintain the piston in the desired position. This may be accomplished by opening the solenoid valve during the peak pressure period or low pressure period, as required on a periodic basis, either as a function of time or a number of crankshaft revolutions.

It is not intended that the invention be limited to the specific embodiment shown in the drawings and described in the specification. It is believed that those skilled in the art will be able to make changes and improvements within the scope of the invention as described herein and set forth in the claims.

What is claimed is:

1. A variable compression ratio internal combustion engine having at least one cylinder, a reciprocating piston disposed in said cylinder and a source of pressurized fluid comprising:
    a cylinder head attached to one end of said cylinder and forming in conjunction therewith a combustion chamber;
    a piston chamber provided in said cylinder head having an open end in communication with said combustion chamber and a closed end;
    a movable piston disposed in said piston chamber and displaceable therein to change the effective volume of said combustion chamber;
    a fluid passageway connecting said closed end of said piston chamber to said source of pressurized fluid;
    a solenoid valve for controlling the fluid flow in said fluid passageway between at least said piston chamber and at least said source of pressurized fluid to change the position of said movable piston in said piston chamber and thereby change the compression ratio of said combustion chamber;
    said source of pressurized fluid being the engine's pressurized oil supply; and
    said solenoid valve being a two-way valve connected between said piston chamber and said pressurized oil supply.

2. A variable compression ratio internal combustion engine having at least one cylinder, a reciprocating piston disposed in said cylinder and a source of pressurized fluid comprising:
    a cylinder head attached to one end of said cylinder and forming in conjunction therewith a combustion chamber;
    a piston chamber provided in said cylinder head having an open end in communication with said combustion chamber and a closed end;
    a movable piston disposed in said piston chamber and displaceable therein to change the effective volume of said combustion chamber;
    a fluid passageway connecting said closed end of said piston chamber to said source of pressurized fluid;
    a solenoid valve for controlling the fluid flow in said fluid passageway between at least said piston chamber and at least said source of pressurized fluid to change the position of said movable piston in said piston chamber and thereby change the compression ratio of said combustion chamber;
    said source of pressurized fluid being the engine's pressurized oil supply; and
    said internal combustion engine having a low pressure oil reservoir and wherein said solenoid valve is a three-way valve having a first state blocking said fluid passageway between said pressurized oil supply and said piston chamber, a second state connecting said pressurized oil supply to said piston chamber and a third state connecting said piston chamber to said low pressure oil reservoir.

3. A variable compression ratio internal combustion engine having at least one cylinder, a reciprocating piston disposed in said cylinder and a source of pressurized fluid comprising:
    a cylinder head attached to one end of said cylinder and forming in conjunction therewith a combustion chamber;
    a piston chamber provided in said cylinder head having an open end in communication with said combustion chamber and a closed end;
    a movable piston disposed in said piston chamber and displaceable therein to change the effective volume of said combustion chamber;
    a fluid passageway connecting said closed end of said piston chamber to said source of pressurized fluid;
    a solenoid valve for controlling the fluid flow in said fluid passageway between at least said piston chamber and at least said source of pressurized fluid to change the position of said movable piston in said piston chamber and thereby change the compression ratio of said combustion chamber; and
    wherein said engine having at least one fuel injector and a pressurized fuel source therefor and wherein said source of pressurized fluid is the pressurized fuel source for said at least one fuel injector.

4. The internal combustion engine of claim 3 wherein said solenoid valve is selectively operable to an open state connecting said pressurized fuel source to said piston chamber and a blocking state blocking the flow of fuel between said pressurized fuel source and said piston chamber.

5. The internal combustion engine of claim 3 wherein said fluid passageway directly connects said pressurized fuel source to said piston chamber, said solenoid valve is selectively operable to an open state connecting said fluid passageway to said pressurized fuel source and a closed state disconnecting said fluid passageway from said pressurized fuel source, and wherein a restricter orifice is disposed in said fluid passageway intermediate said pressurized fuel source and said solenoid valve.

6. The internal combustion engine of claim 3 wherein said solenoid valve is a three-position valve that is selectively operable to a first position blocking said fluid passageway between said pressurized fuel source and said piston chamber, a second position connecting said pressurized fuel source to said piston chamber and a third position connecting said piston chamber to an unpressurized fuel source.

7. A method for changing the compression ratio of an internal combustion engine having at least one cylinder, a cylinder head providing a combustion chamber at one end of said at least one cylinder, a source of unpressurized fluid and a source of pressurized fluid, said method comprising the steps of:
   providing a piston chamber in said cylinder head to increase the effective volume of said combustion chamber;
   disposing a piston in said piston chamber;
   detecting when the pressure in said combustion chamber has a minimum value to generate a pressurized signal;
   operating a solenoid valve means to a first position with said pressurize signal to connect said piston chamber to said source of pressurized fluid, said pressurized fluid displacing said piston to decrease the effective volume of said combustion chamber;
   detecting when the pressure in said combustion chamber has a peak pressure to generate a vent signal; and
   operating said solenoid valve means to a second position in response to said vent signal to connect said piston chamber to said source of unpressurized fluid, said peak pressure displacing said piston to increase the effective volume of said combustion chamber.

8. A method for varying the compression ratio of an internal combustion engine having at least one cylinder, a cylinder head enclosing one end of said at least one cylinder and forming a combustion chamber therewith, a source of unpressurized fluid and a source of pressurized fluid, said method comprising the steps of:
   providing a piston chamber in said cylinder head to increase the effective volume of said combustion chamber;
   disposing a piston in said piston chamber;
   connecting said piston chamber to a source of pressurized fluid to displace said piston in a direction decreasing said effective volume of said combustion chamber;
   generating a decrease compression ratio signal indicative of a desire to decrease the compression ratio of said internal combustion engine;
   detecting in response to said decrease compression ratio signal when the pressure in said combustion chamber has a peak pressure to generate a vent signal; and
   actuating a solenoid valve means with said vent signal to vent said piston chamber to said source of unpressurized fluid, said peak pressure displacing said piston to increase the effective volume of said combustion chamber.

9. A method for varying the compression ratio of an internal combustion engine having at least one cylinder, a cylinder head enclosing one end of said at least one cylinder and forming a combustion chamber therein, a source of unpressurized fluid, a source of pressurized fluid and means for generating a first and a second change compression ratio signal, said method comprising the steps of:
   providing a piston chamber in said cylinder head to increase the effective volume of said combustion chamber;
   disposing a piston in said piston chamber;
   detecting when said combustion chamber has a peak pressure in response to said first change compression ratio signal to generate a vent signal;
   actuating a solenoid valve means with said vent signal to vent said piston chamber to said source of unpressurized fluid permitting said peak pressure to displace said piston to increase the effective volume of said combustion chamber;
   detecting when said combustion chamber has a minimum pressure in response to said second change compression ratio signal to generate a pressurize signal; and
   actuating said solenoid valve means with said pressurize signal to connect said piston chamber to said source of pressurized fluid displacing said piston in a direction decreasing the effective volume of said combustion chamber.

10. A variable compression ratio internal combustion engine having a combustion chamber cooperatively defined by a cylinder within which a power piston reciprocates to drive a crankshaft and by a cylinder head containing a piston chamber having an open end in communication with said combustion chamber, a closed end that is opposite said open end, and a movable control piston disposed within said piston chamber and displaceable between said open and closed ends thereof to change the effective volume of said combustion chamber, and hence vary the compression ratio, characterized in that;
   a means of controlling fluid ingress and egress to and from a volume of said piston chamber that is defined by said control piston and said closed end of said piston chamber, said means being the sole means of controlling said fluid and comprises a two-way solenoid valve which is disposed in a passageway between said piston chamber and a source of said fluid and through which the ingress and egress of said fluid to and from said piston chamber occurs.

11. A variable compression ratio internal combustion engine having a combustion chamber cooperatively defined by a cylinder within which a power piston reciprocates to drive a crankshaft and by a cylinder head containing a piston chamber having an open end in communication with said combustion chamber, a closed end that is opposite said open end, and a movable control piston disposed within said piston chamber and displaceable between said open and closed ends thereof to change the effective volume of said combustion chamber, and hence vary the compression ratio, characterized in that:
   a means of controlling fluid ingress and egress to and from a volume of said piston chamber that is defined by said control piston and said closed end of said piston chamber, said means being the sole means of controlling said fluid and comprises a three-way solenoid valve which is disposed in passageways between said piston chamber, a source of said fluid, and a dump for said fluid and through which the ingress and egress of said fluid to and from said piston chamber occurs.

* * * * *